(12) United States Patent
Auernhammer et al.

(10) Patent No.: US 8,930,715 B2
(45) Date of Patent: *Jan. 6, 2015

(54) ADDRESS TRANSLATION UNIT, DEVICE AND METHOD FOR REMOTE DIRECT MEMORY ACCESS OF A MEMORY

(75) Inventors: Florian A. Auernhammer, Rueschlikon (CH); Nikolaos Chrysos, Rueschlikon (CH); Rolf Clauberg, Rueschlikon (CH); Andreas C. Doering, Rueschlikon (CH); Ronald P. Luijten, Rueschlikon (CH); Patricia M. Sagmeister, Rueschlikon (CH)

(73) Assignee: International Business Machines Corporation, Armonk, NY (US)

( * ) Notice: Subject to any disclaimer, the term of this patent is extended or adjusted under 35 U.S.C. 154(b) by 172 days.

This patent is subject to a terminal disclaimer.

(21) Appl. No.: 13/480,979

(22) Filed: May 25, 2012

(65) Prior Publication Data

US 2012/0303948 A1    Nov. 29, 2012

(30) Foreign Application Priority Data

May 26, 2011   (EP) .................................. 11167571

(51) Int. Cl.
*G06F 11/30* (2006.01)
*G06F 12/10* (2006.01)
*H04L 9/00* (2006.01)
*H04L 9/08* (2006.01)
*H04L 9/32* (2006.01)
*G06F 12/14* (2006.01)

(52) U.S. Cl.
CPC .............. *G06F 12/1081* (2013.01); *H04L 9/00* (2013.01); *H04L 9/0894* (2013.01); *H04L 9/3247* (2013.01); *G06F 12/1408* (2013.01)
USPC ........................... 713/190; 713/150; 713/193

(58) Field of Classification Search
USPC ........................... 713/150, 190, 193; 711/206
See application file for complete search history.

(56) References Cited

U.S. PATENT DOCUMENTS

| | | | |
|---|---|---|---|
| 6,041,123 A * | 3/2000 | Colvin, Sr. ..................... | 713/153 |
| 6,594,712 B1 | 7/2003 | Pettey et al. | |
| 7,370,174 B2 | 5/2008 | Arizpe et al. | |
| 7,587,575 B2 | 9/2009 | Mortl et al. | |
| 7,702,826 B2 | 4/2010 | Oztaskin et al. | |
| 2002/0184046 A1 * | 12/2002 | Kamada et al. ................... | 705/1 |
| 2006/0236063 A1 | 10/2006 | Hausauer et al. | |
| 2010/0169636 A1 | 7/2010 | Davis et al. | |

OTHER PUBLICATIONS

Recio, R.J., "Server I/O Networks Past, Present, and Future", SIGCOMM'03, Aug. 25-29, 2003, Karlsruhe, Germany, 2003, ACM 1-58113-735-4/03/0008.

* cited by examiner

*Primary Examiner* — Farid Homayounmehr
*Assistant Examiner* — Suman Debnath
(74) *Attorney, Agent, or Firm* — Scully, Scott, Murphy & Presser, P.C.; Jeff Tang, Esq.

(57) ABSTRACT

An address translation unit for Remote Direct Memory Access (RDMA) of a memory of a processor is provided. The address translation unit comprises an address translator and a signer. The address translator is configured to translate a received virtual address in a real address of the memory. The signer is configured to cryptographically sign the real address.

15 Claims, 7 Drawing Sheets

ADDRESS TRANSLATION UNIT, DEVICE AND METHOD FOR REMOTE DIRECT MEMORY ACCESS OF A MEMORY

CROSS-REFERENCE TO RELATED APPLICATIONS

The present invention relates to and claims the benefit of the filing date of commonly-owned, co-pending European Patent Application No. EP 11167571.6, filed May 26, 2011, the entire contents and disclosure of which is incorporated by reference as if fully set forth herein.

FIELD OF THE INVENTION

The invention relates to an address translation unit and to a method for Remote Direct Memory Access (RDMA) of a memory of a processor. Further, the invention relates to a device, for example an I/O device, including such an address translation unit and to a checker for a processor having a memory being accessible by RDMA.

BACKGROUND

The technical field is directed to I/O systems including an I/O device being coupled to a processor or server comprising the memory. The processor and the I/O device may be coupled by an I/O bus. As an interface to the I/O bus, an I/O bridge may be used or the processor may comprise an I/O Memory-Managed Unit (I/O MMU). The memory may be controlled by a dedicated memory controller.

In secure I/O systems traditionally, the processor and the I/O bridge are provided by the same vendor. In order to separate the I/O devices from each other, each I/O device is connected to the I/O bridge with a separate I/O link, in particular PCI Express. The I/O bridge contains logic that translates the addresses used by the I/O device into system addresses. As the I/O bridge and the firmware are provided by the same vendor, he can ensure that there is no possibility to corrupt the address translation such that the device can access addresses that it should not access.

With the consolidation towards PCI Express and to reduce latency and system complexity, I/O systems are moving towards using just an MMU integrated in the processor I/O complex. However, the MMU there has the disadvantage that it is shared between all I/O devices connected to its I/O link. Therefore, the I/O devices have to share the translation cache of the MMU which may increase space requirements and may create the problem of cache thrashing. To alleviate this problem, the PCIe AT extensions for address translation may allow the I/O devices to request an address translation from the PCIe root complex and to store it in a local cache. The I/O device can then use the translation later on and may use a bit in the header to indicate in the transfer that the address has already been translated, such that the I/O root complex may directly use the address provided by the I/O device.

The problem for secure systems is that there is no possibility to check whether the translated address has not been changed by the I/O device. Therefore, to use this scheme, the processor vendor needs to trust the switch and device vendor that they are not using different system addresses than provided by the root complex.

Growing network speed leads to the use of so-called Remote Direct Memory Access Network Interface Adapters (RNICs). RNICs allow a placement of data received from a network directly into the memory or application memory of a processor or a server. As indicated above, the problem for a vendor of such a processor or server including said memory is that they have to trust the correct implementation of the protection mechanism in the RNIC.

Conventionally, address translation protection is either implemented in the driver software or in hardware as a part of the I/O system.

Both may be developed, produced and verified by the server vendor who takes responsibility for the dependable operation of the entire I/O system, including the I/O device and the application. An error in the I/O device may only harm the application in a limited way, in particular it may receive corrupted I/O data in the expected location.

An RNIC writes or reads I/O data and I/O-related control information. for example completion signals, directly to memory locations shared with the application when using virtual addresses.

In most computers or servers, the virtual address of an application is translated into a real address. This allows a dynamic allocation of memory to several applications while maintaining a contiguous address base for each application. Therefore, the address used by an RNIC has to be translated with the same mechanism.

Therefore, memory locations accessed by an RNIC may be distributed in the entire memory. If the computer or server wants to protect these memory accesses, it needs to do an extra check to each access. Since these accesses may be widely distributed with little locality, caches may not help much to reduce the overhead for the server-side check. Furthermore, extra server-side checks create extra memory bandwidth, system cost and power consumption and may reduce the system performance.

Accordingly, it is an aspect of the present invention to provide an improved secure Remote Direct Memory Access (RDMA) of a memory of a processor.

BRIEF SUMMARY OF THE INVENTION

According to a first aspect, an address translation unit for Remote Direct Memory Access (RDMA) of a memory of a processor is suggested. The address translation unit comprises an address translator and a signer. The address translator is configured to translate a received virtual address in a real address of the memory. The signer is configured to cryptographically sign the real address.

By cryptographically signing the real address, RDMA of the memory may be secured. Further, the overhead for processor-side checks is reduced, in particular regarding memory bandwidth, system cost and power consumption. Thus, system performance may be increased.

According to some implementations, the address translation unit provides address translation functionality for RDMA operations of an I/O device supporting multiple address spaces, access attributes and sizes. For example, different access attributes may be read, write or atomic. The address translation unit may contain caches to increase the performance. An I/O device comprising said address translation unit may issue the memory access with the translated and cryptographically signed real address. The real address may be a physical address of the memory.

In an embodiment, the signer is configured to provide a digital signature for the real address on the basis of the virtual address and a client key allocated to the memory. The client key allocated to the memory may be dynamically refreshed.

In a further embodiment, the address translation unit comprises a transmitter for transmitting the real address together with the provided digital signature for the real address to the processor. The transmitter of the address translation unit and the processor may be coupled by an I/O bus.

In a further embodiment, the address translation unit comprises a first storage for storing a number of client keys for securing Remote Direct Memory Access (RDMA) of a number of memories of at least one processor.

Each client key of the number of client keys is allocated to a respective memory of the number of memories or application process. The number of client keys may be provided by an external component, for example by a smartcard or by a smartcard chip.

The client keys may be dynamically exchanged. The client keys may be used to sign requests and issued addresses. In order to maintain protection against key-breaking attempts, the client keys are frequently exchanged. Further, the client keys may be local to a virtual device, partition or the like.

In a further embodiment, the address translation unit comprises a second storage and an exchanger. The second storage is configured to store a master key. The master key is adapted to secure an exchange of the number of client keys stored in the first storage. The exchanger is configured to exchange the number of client keys by means of the master key and in dependence on at least one predefined condition.

The predefined condition may be an expiration of a predefined duration. When said predefined duration expires, the number of client keys in the first storage is exchanged, in particular renewed. The master key may be embodied as a hard-wired key. The number of client keys may be a plurality of client keys. The master key may be a hard-wired key which may be used to establish an authorized initializing with the device driver.

In a further embodiment, the address translation unit comprises a requester for generating a request for requesting the memory of the processor to send translation data for translating the received virtual address in the real address of the memory.

The requester may generate memory access requests. These memory access requests may also contain an additional digital signature. When the address translation unit receives data for a generated read request, it may check the digital signature to ensure that the data has not been tempered.

In a further embodiment, the signer is configured to cryptographically sign the generated request. The signer may be configured to provide a digital signature for cryptographically signing the request on the basis of the generated request and the client key allocated to the memory.

In a further embodiment, the address translator is configured to provide an expiration indication for the real address, wherein the expiration indication indicates at least one condition for an expiration of the real address.

The expiration indication may be or may include a time stamp indicating a time after which the validity of the real address is expired.

Any embodiment of the first aspect may be combined with any embodiment of the first aspect to obtain another embodiment of the first aspect.

According to a second aspect, a checker for a processor having a memory being accessible by Remote Direct Memory Access (RDMA) is suggested. The checker is coupleable to an address translation unit of the first aspect or of an embodiment of the first aspect. The checker is configured to check a received cryptographically signed real address.

The checker may check the received cryptographically signed real address to verify that the received cryptographically signed real address originated from the address translation unit and was not tampered.)

In an embodiment, the checker is configured to cryptographically sign translation data being requested by the address translation unit. The checker may be configured to provide a digital signature for cryptographically signing the translation data on the basis of the translation data and the client key allocated to the memory.

The address translator may be any address translating means. Moreover, the signer may be any signing means. The transmitter may be any transmitting means. Furthermore, the exchanger may be any exchanging means. The checker may be any checking means.

The respective means may be implemented in hardware or in software. If said means are implemented in hardware, it may be embodied as a device, e.g. as a computer or as a processor or as a part of a system, e.g. a computer system. If said means are implemented in software it may be embodied as a computer program product, as a function, as a routine, as a program code or as an executable object.

According to a third aspect, a device is suggested which comprises at least one address translation unit of the first aspect or of an embodiment of the first aspect.

In an embodiment, the device is embodied as an I/O device. Further, the device is embodied as a network component of a communication network In a further embodiment, the I/O device has an I/O driver and the address translation unit has a separate address translation unit driver. The address translation unit driver may be requested by the I/O device driver for creating, updating, and destroying address translation tables for translating virtual addresses into real addresses.

According to a fourth aspect, method for Remote Direct Memory Access (RDMA) of a memory of a processor is provided. In a first step, a received virtual address is translated in a real address of the memory. In a second step, the real address is cryptographically signed. In particular, for cryptographically signing the real address, a digital signature for the real address is provided on the basis of the virtual address and a client key allocated to the memory.

According to a fifth aspect, the invention relates to a computer program comprising a program code for executing the method of the third aspect for adjusting a set of primary rate limits for transmission rates of data flows having a certain priority in a transmitter when run on at least one computer.

In the following, exemplary embodiments of the present invention are described with reference to the enclosed figures.

BRIEF DESCRIPTION OF THE DRAWINGS

Similar or functionally similar elements in the figures have been allocated the same reference signs if not otherwise indicated.

DETAILED DESCRIPTION OF THE EMBODIMENTS

Figure 1:
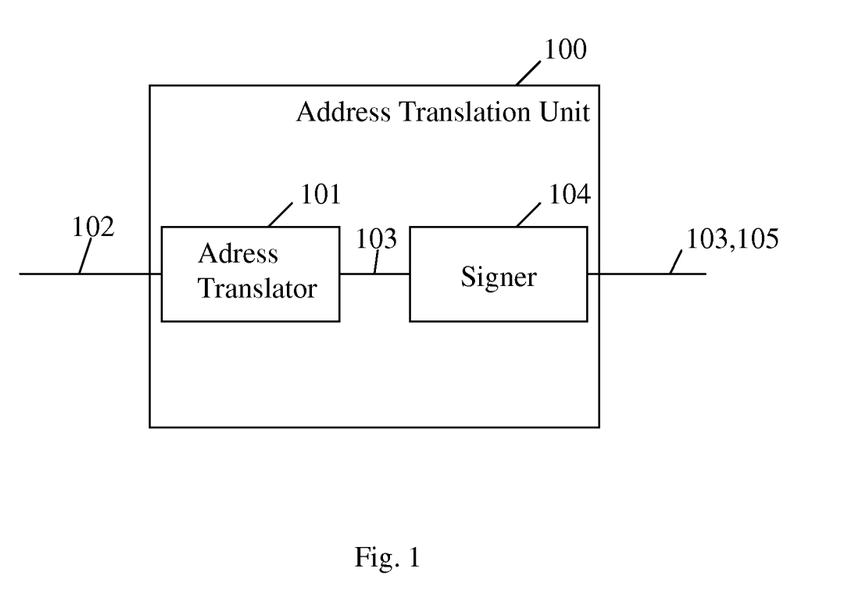
FIG. 1 shows a schematic block diagram of a first embodiment of an address translation unit for RDMA of a memory of a processor.

In FIG. 1, a schematic block diagram of a first embodiment of an address translation unit 100 for RDMA of a memory of a processor is depicted. The address translation unit 100 comprises an address translator 101. The address translator 101 is configured to translate a received virtual address 102 in a real address 103 of the memory. The real address 103 is provided to a signer 104. The signer 104 cryptographically signs the real address 103. In particular, the signer 104 is configured to provide a digital signature 105 for the real address 103, for example on the basis of the virtual address 102 and a client key allocated to the memory.

The address translator 101 is configured to provide an expiration indication for the real address 103. The expiration indication may indicate at least one condition for an expiration of the real address.

Further, the address translation unit 100 may a part of a device, for example an I/O device.

In this regard, the I/O device may have an I/O driver, and the address translation unit 100 may have a separate address translation unit driver. The address translation unit driver may be requested by the I/O device driver for creating and withdrawing address translation tables for translating virtual addresses 102 into real addresses 103.

The address translation unit driver may request the operating system of the processor about memory mapping information. It may be up to specification whether the I/O driver or the address translation driver manages pinning of memory pages. Further, there may be several address translation unit drivers for a virtualized adapter corresponding to multiple logical adapters.

Figure 2:
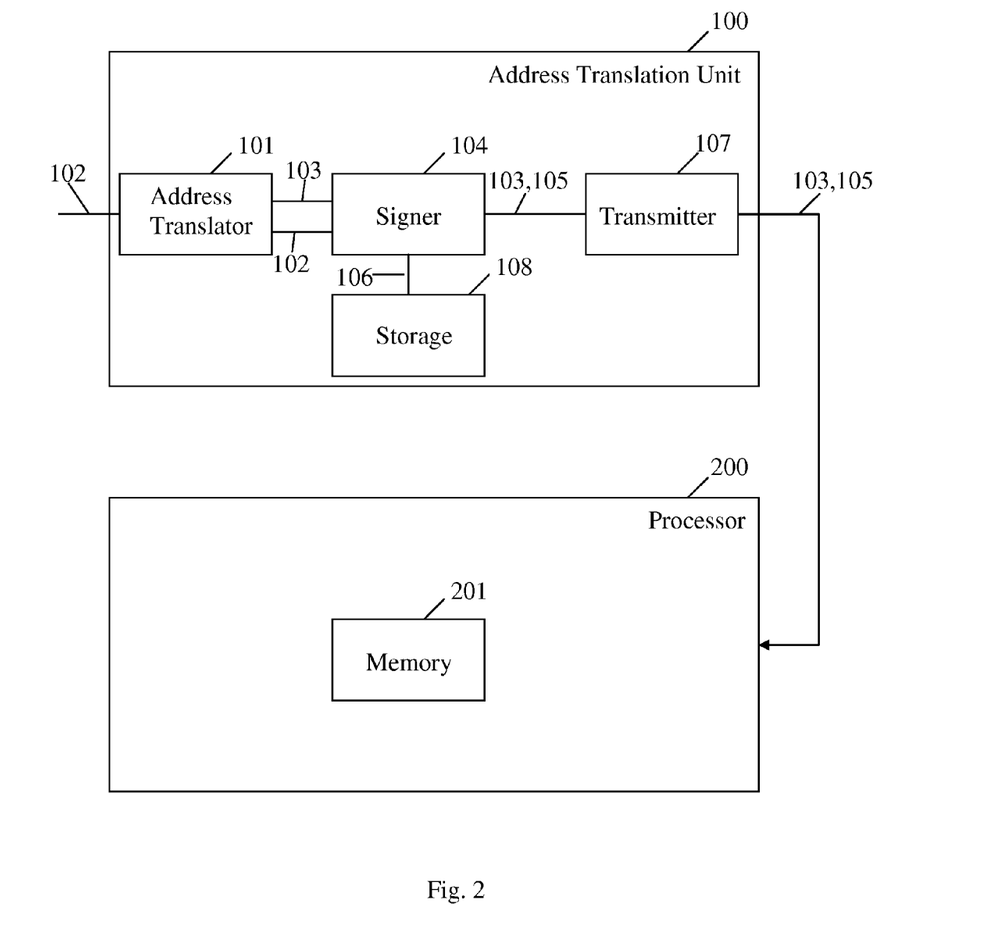
FIG. 2 shows a schematic block diagram of a second embodiment of an address translation unit for RDMA of a memory coupled to a processor including said memory.

FIG. 2 shows a schematic block diagram of a second embodiment of an address translation unit 100 for RDMA of a memory 201 coupled to a processor 200 including said memory 201.

The address translation unit 100 of FIG. 2 may be embodied as the address translation unit 100 of FIG. 1 and comprises an address translator 101 and a signer 104. The address translator 101 receives the virtual address 102 of the memory 201 and translates the received virtual address 102 in a real address 103 of the memory 201. The translated real address 103 is provided to the signer 104. Moreover, the virtual address 102 may be provided to the signer 104.

Further, the address translation unit 100 comprises storage 108. The storage 108 is configured to store at least one client key 106, in particular a number of client keys 106 for securing RDMA of a number of memories 201 of at least one processor 200.

In this regard, the signer 104 is configured to provide a digital signature 105 for the real address 103 on the basis of the virtual address 102 and a client key 106 allocated to the memory 201 and provided by the storage 108.

Thus, the signer 104 outputs the real address 103 and the digital signature 105 to a transmitter 107. The transmitter 107 transmits the real address 103 together with the provided digital signature 105 for the real address 103 to the processor 200.

Figure 3:
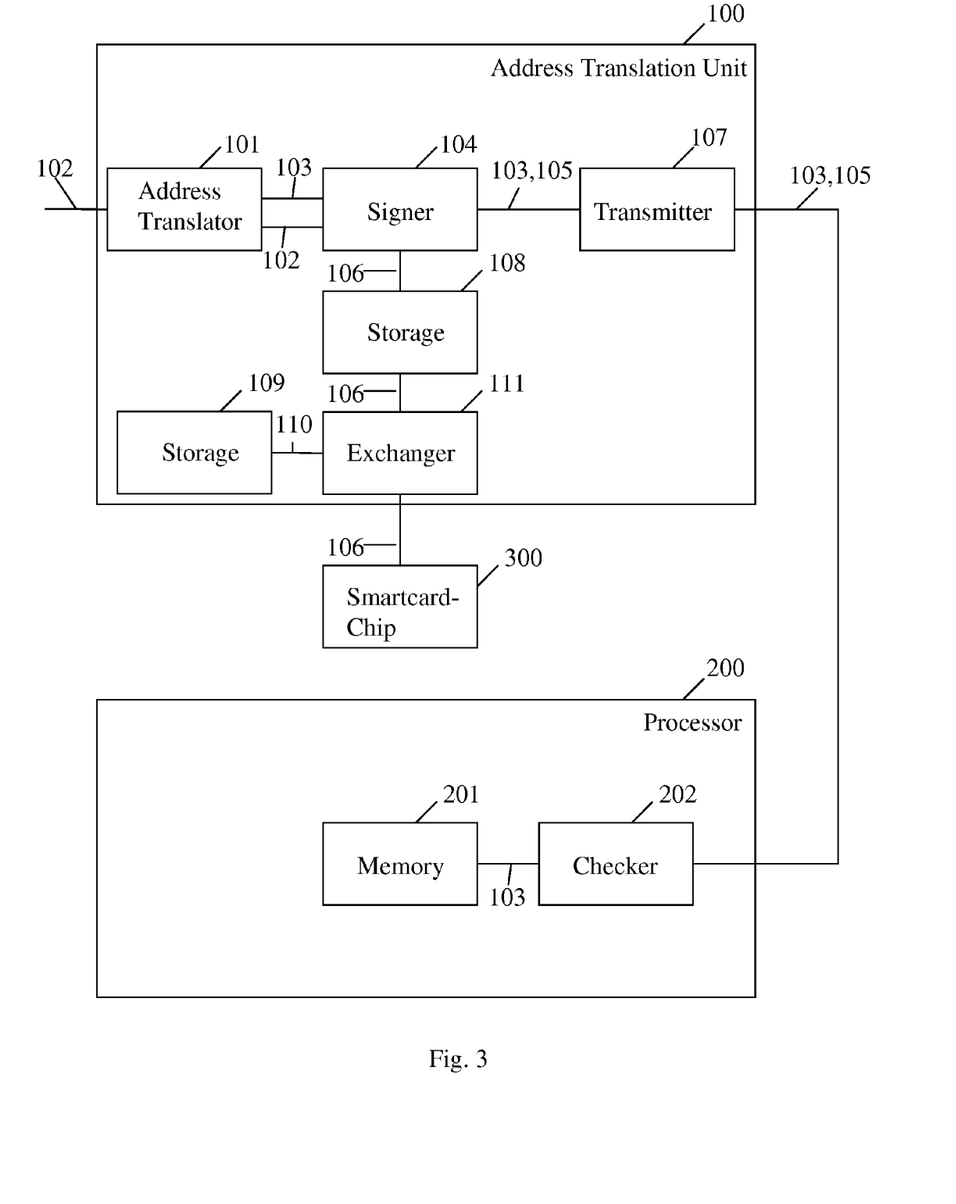
FIG. 3 shows a schematic block diagram of a third embodiment of an address translation unit for RDMA of a memory coupled to a processor including said memory.

In FIG. 3, a schematic block diagram of a third embodiment of an address translation unit 100 for RDMA of a memory 201 coupled to a processor 200 including said memory 201 is illustrated.

The address translation unit 100 of FIG. 3 is based on the address translation unit 100 of FIG. 2 and may have all the features of said address translation unit 100 of FIG. 2.

Further, the address translation unit 100 of FIG. 3 has a further storage 109 and an exchanger 111 coupled to a smartcard chip 300.

The further storage 109 is adapted to store a master key 110. The master key 110 is configured to secure an exchange of the number of client keys 106 stored in the storage 108. The master key 110 is provided to the exchanger 111 for exchanging the number of client keys 106 by means of the master key 110 and independence on at least one predefined condition. The predefined condition may be an expiration of a predefined duration. When said predefined duration expires, the number of client keys 106 in the first storage 108 may be exchanged, in particular renewed. The master key 110 may be embodied as a hard-wired key.

The smartcard chip 300 is configured to provide new or refreshed client keys 106 which may be exchanged by the exchanger 111. In this regard, the exchanger 111 couples the storage 108 and the smartcard chip 300.

Further, with respect to FIG. 3, the processor 200 may be provided with a checker 202 coupled to the memory 201. Moreover, the checker 202 may be coupled to the address translation unit 100 and may be configured to check a received cryptographically signed real address 103, 105. Thus, the checker may verify that a received real address 103 is actually provided by a defined address translation unit 100 being part of a certain device, like an I/O device.

Figure 4:
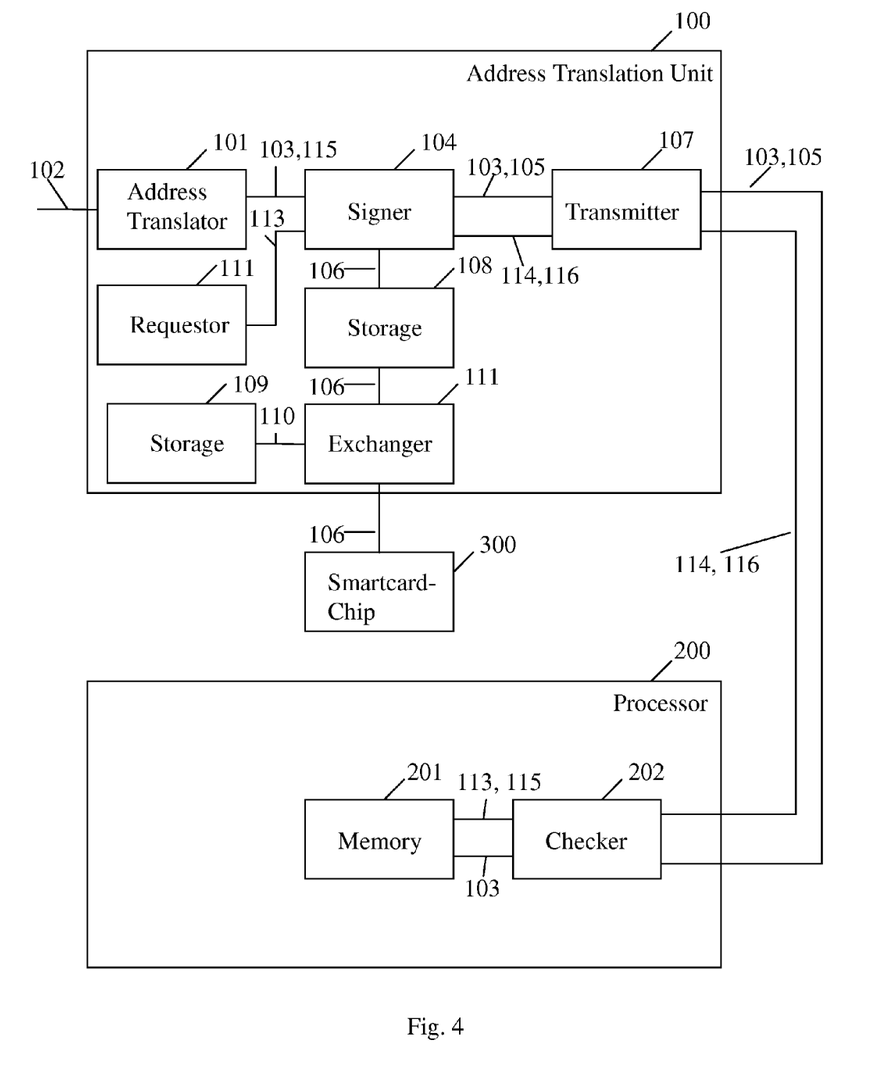
FIG. 4 shows a schematic block diagram of a fourth embodiment of an address translation unit for RDMA of a memory coupled to a processor including said memory.

In FIG. 4, a fourth embodiment of an address translation unit 100 for RDMA of a memory 201 coupled to the processor 200 including said memory 201 is depicted.

The fourth embodiment of the address translation unit 100 according to FIG. 4 is based on the third embodiment of the address translation unit 100 of FIG. 3 and may comprise all its features.

Further, the address translation unit 100 of FIG. 4 has a requester 111. The requester 111 is configured to generate a request 113 for requesting the memory 201 of the processor 200. In this regard, the requester 111 generates the request 113 and provides it to the signer 104. The signer 104 generates a cryptographically signed request 114 and provides the cryptographically signed request 114 to the transmitter 107. The transmitter 107 transmits the cryptographically signed request 114 to the checker 202 of the processor 200. The checker 202 checks the received cryptographically signed request 114 and, if positive, provides the request 113 to the memory for receiving translation data 115. Further, the checker 202 is configured to cryptographically sign the translation data 115 for outputting cryptographically signed translation data 116, which are provided to the transmitter 107 of the address translation unit 100. The transmitter 107 forwards the cryptographically signed translation data 116 to the signer 104. The signer 104 checks the cryptographically signed translation data 116 and, if positive, provides the translation data 115 to the address translator 101. The address translator 101 uses the received translation data 115 for translating a received virtual address 102 in a real address 103 of the memory 201.

Figure 5:
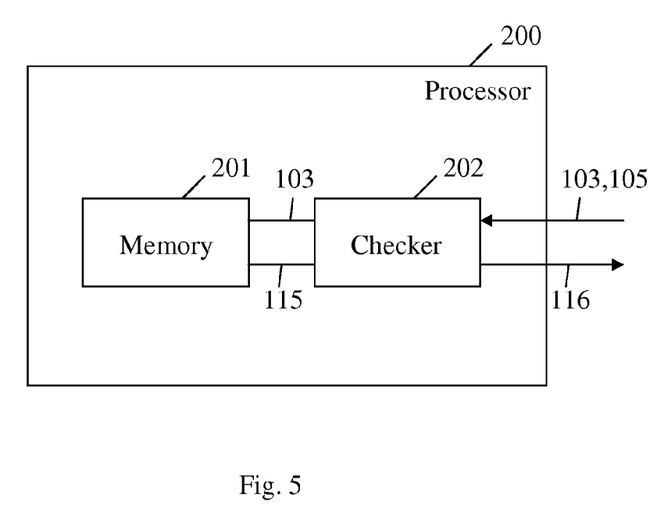
FIG. 5 shows a schematic block diagram of an embodiment of checker for a processor having a memory being accessible by RDMA.

FIG. 5 shows a schematic block diagram of an embodiment of a checker 202 of a processor 200 having a memory 201 which is accessible by RDMA. The checker 202 is coupleable to an address translation unit 100, for example to one of the address translation units 100 of FIGS. 1 to 4.

The checker 202 may receive a real address 103 and a digital signature 105 for the real address 103. The checker 202 is configured to check the real address 103 and its digital signature 105. If positive, the checker 202 forwards the real address 103 to the memory 201. Thus, the memory 201 may provide the requested data in dependence on the received real address 103 (not shown). Further, the memory 201 may provide requested translation data 115 to the checker 202. The checker 202 may cryptographically sign the translation data 115 for outputting cryptographically signed translation data 116, which may be provided to the address translation unit 100 of FIG. 4, for example.

Figure 6:
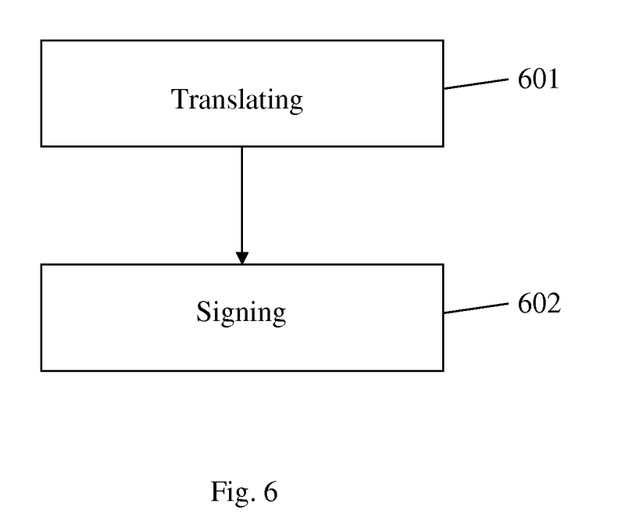
FIG. 6 shows an embodiment of a sequence of method steps for RDMA of a memory of a processor.

In FIG. 6, an embodiment of a sequence of method steps for RDMA of a memory of a processor is depicted.

In step 601, a received virtual address is translated into a real address of the memory. In step 602, the real address is cryptographically signed and particularly transmitted to the processor for requesting the memory.

Computerized devices can be suitably designed for implementing embodiments of the present invention as described herein. In that respect, it can be appreciated that the methods described herein are largely non-interactive and automated. In exemplary embodiments, the methods described herein can be implemented either in an interactive, partly-interactive or non-interactive system. The methods described herein can be implemented in software (e.g., firmware), hardware, or a combination thereof. In exemplary embodiments, the methods described herein are implemented in software, as an executable program, the latter executed by suitable digital processing devices. In further exemplary embodiments, at least one step or all steps of above method of FIG. 6 may be implemented in software, as an executable program, the latter executed by suitable digital processing devices. In further exemplary embodiments, the determining step and the obtaining step of above method of FIG. 6 are implemented in software, in particular for the case that the duty cycle of the certain priority at the port is provided the that software. More generally, embodiments of the present invention can be implemented wherein general-purpose digital computers, such as personal computers, workstations, etc., are used.

Figure 7:
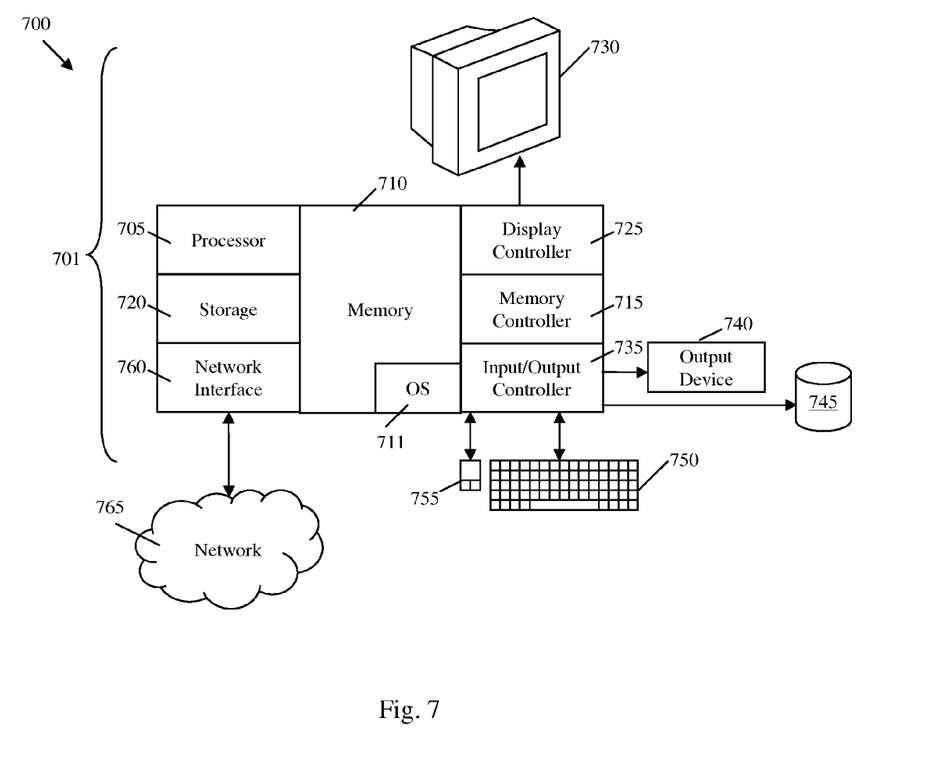
FIG. 7 shows a schematic block diagram of an embodiment of a system adapted for performing the method for adjusting a set of primary rate limits for transmission rates of data flows having a certain priority in a transmitter.

For instance, the system 700 depicted in FIG. 7 schematically represents a computerized unit 701, e.g., a general-purpose computer. In exemplary embodiments, in terms of hardware architecture, as shown in FIG. 7, the unit 701 includes a processor 705, memory 710 coupled to a memory controller 715, and one or more input and/or output (I/O) devices 740, 745, 750, 755 (or peripherals) that are communicatively coupled via a local input/output controller 735. The input/output controller 735 can be, but is not limited to, one or more buses or other wired or wireless connections, as is known in the art. The input/output controller 735 may have additional elements, which are omitted for simplicity, such as controllers, buffers (caches), drivers, repeaters, and receivers, to enable communications. Further, the local interface may include address, control, and/or data connections to enable appropriate communications among the aforementioned components. For example, the I/O device 740 may include or implement an address translation unit of one of FIGS. 1 to 4. Also, the I/O device 745 may include or implement an address translation unit of one of FIGS. 1 to 4. Moreover, the input/output controller 735 may include or implement a checker of one of FIGS. 3 to 5.

The processor 705 is a hardware device for executing software, particularly that stored in memory 710. The processor 705 can be any custom made or commercially available processor, a central processing unit (CPU), an auxiliary processor among several processors associated with the computer 701, a semiconductor based microprocessor (in the form of a microchip or chip set), or generally any device for executing software instructions.

The memory 710 can include any one or combination of volatile memory elements (e.g., random access memory) and nonvolatile memory elements. Moreover, the memory 710 may incorporate electronic, magnetic, optical, and/or other types of storage media. Note that the memory 710 can have a distributed architecture, where various components are situated remote from one another, but can be accessed by the processor 705.

The software in memory 710 may include one or more separate programs, each of which comprises an ordered listing of executable instructions for implementing logical functions. In the example of FIG. 7, the software in the memory 710 includes methods described herein in accordance with exemplary embodiments and a suitable operating system (OS) 711. The OS 711 essentially controls the execution of other computer programs, such as the methods as described herein (e.g., FIG. 6), and provides scheduling, input-output control, file and data management, memory management, and communication control and related services.

The methods described herein may be in the form of a source program, executable program (object code), script, or any other entity comprising a set of instructions to be performed. When in a source program form, then the program needs to be translated via a compiler, assembler, interpreter, or the like, as known per se, which may or may not be included within the memory 710, so as to operate properly in connection with the OS 711. Furthermore, the methods can be written as an object oriented programming language, which has classes of data and methods, or a procedure programming language, which has routines, subroutines, and/or functions.

Possibly, a conventional keyboard 750 and mouse 755 can be coupled to the input/output controller 735. Other I/O devices 740-755 may include sensors (especially in the case of network elements), i.e., hardware devices that produce a measurable response to a change in a physical condition like temperature or pressure (physical data to be monitored). Typically, the analog signal produced by the sensors is digitized by an analog-to-digital converter and sent to controllers 735 for further processing. Sensor nodes are ideally small, consume low energy, are autonomous and operate unattended.

In addition, the I/O devices 740-755 may further include devices that communicate both inputs and outputs. The system 700 can further include a display controller 725 coupled to a display 730. In exemplary embodiments, the system 700 can further include a network interface or transceiver 760 for coupling to a network 765.

The network 765 transmits and receives data between the unit 701 and external systems. The network 765 is possibly implemented in a wireless fashion, e.g., using wireless protocols and technologies, such as WiFi, WiMax, etc. The network 765 may be a fixed wireless network, a wireless local area network (LAN), a wireless wide area network (WAN) a personal area network (PAN), a virtual private network (VPN), intranet or other suitable network system and includes equipment for receiving and transmitting signals.

The network 765 can also be an IP-based network for communication between the unit 701 and any external server, client and the like via a broadband connection. In exemplary embodiments, network 765 can be a managed IP network administered by a service provider. Besides, the network 765 can be a packet-switched network such as a LAN, WAN, Internet network, etc.

If the unit 701 is a PC, workstation, intelligent device or the like, the software in the memory 710 may further include a basic input output system (BIOS). The BIOS is stored in ROM so that the BIOS can be executed when the computer 701 is activated.

When the unit 701 is in operation, the processor 705 is configured to execute software stored within the memory 710, to communicate data to and from the memory 710, and to generally control operations of the computer 701 pursuant to the software. The methods described herein and the OS 711, in whole or in part are read by the processor 705, typically buffered within the processor 705, and then executed. When the methods described herein (e.g. with reference to FIG. 6) are implemented in software, the methods can be stored on any computer readable medium, such as storage 720, for use by or in connection with any computer related system or method.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects. Furthermore, aspects of the present invention may take the form of a computer program product embodied in one or more computer readable medium(s) having computer readable program code embodied thereon. Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the unit 701, partly thereon, partly on a unit 701 and another unit 701, similar or not.

Aspects of the present invention are described above with reference to flowchart illustrations and/or block diagrams of methods, apparatus (systems) and computer program products according to embodiments of the invention. It will be understood that each block of the flowchart illustrations and/or block diagrams can be implemented by one or more computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved and algorithm optimization. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

More generally, while the present invention has been described with reference to certain embodiments, it will be understood by those skilled in the art that various changes may be made and equivalents may be substituted without departing from the scope of the present invention. In addition, many modifications may be made to adapt a particular situation to the teachings of the present invention without departing from its scope. Therefore, it is intended that the present invention not be limited to the particular embodiments disclosed, but that the present invention will include all embodiments falling within the scope of the appended claims.

The invention claimed is:

1. An address translation unit for Remote Direct Memory Access (RDMA) of a memory of a processor, the address translation unit comprising:
an address translator device for translating a received virtual address into a real address of the memory, said memory being directly remotely accessible by a network via RDMA operations; and a signer for cryptographically signing the real address to provide a digital signature for the real address, said digital signature provided on a basis of the virtual address and a key allocated to said memory;

a transmitter device coupled to the signer, the transmitter device transmitting the real address together with the provided digital signature for the real address to the processor for requesting the memory;

wherein a checker device associated with the processor is configured to:

receive the cryptographically signed real address and its digital signature and verify that the received cryptographically signed real address originated from the translation unit and was not tampered with, and forward data at the real address for receipt at the translation unit.

2. The address translation unit of claim 1, further comprising:

a first storage for storing a number of client keys for securing Remote Direct Memory Access (RDMA) of a number of memories of at least one processor.

3. The address translation unit of claim 2, further comprising:

a second storage for storing a master key being configured to secure an exchange of the number of client keys stored in the first storage, and an exchanger for exchanging the number of client keys by means of the master key and in dependence on at least one predefined condition.

4. The address translation unit of claim 1, further comprising:

a requester for generating a request for requesting the memory of the processor to send translation data for translating the received virtual address into the real address of the memory.

5. The address translation unit of claim 4, wherein the signer is configured to cryptographically sign the generated request.

6. The address translation unit of claim 1, wherein the address translator device is configured to provide an expiration indication for the real address, wherein the expiration indication indicates at least one condition for an expiration of the real address.

7. A device for Remote Direct Memory Access (RDMA) of a memory of a processor comprising:

at least one address translation unit, the address translation unit comprising:

an address translator device for translating a received virtual address into a real address of the memory, said memory being directly remotely accessible by a network via RDMA operations;

a signer for cryptographically signing the real address to provide a digital signature for the real address, said digital signature provided on a basis of the virtual address and a key allocated to said memory; and a transmitter device coupled to the signer, the transmitter device transmitting the real address together with the provided digital signature for the real address to the processor for requesting the memory;

wherein a checker device associated with the processor is configured to:

receive the cryptographically signed real address and its digital signature and verify that the received cryptographically signed real address originated from the translation unit and was not tampered with, and forward data at the real address for receipt at the translation unit.

8. The device of claim 7, wherein the device is embodied as an I/O device or as a network component of a communication network.

9. The device of claim 8, wherein the I/O device has an I/O driver and the address translation unit has a separate address translation unit driver, wherein the address translation unit driver is requested by the I/O device driver to create and destroy address translation tables for translating virtual addresses into real addresses.

10. A computer program product for remote direct memory access (RDMA) of a memory of a processor, the computer program product comprising a tangible, non-transitory storage medium readable by a processing circuit and storing instructions run by the processing circuit for performing a method comprising:

translating, at an address translation unit, a received virtual address into a real address of the memory, cryptographically signing, by a signer, the real address to provide a digital signature for the real address, said digital signature provided on a basis of the virtual address and a key allocated to said memory;

transmitting, via a transmitter coupled to the signer, the real address together with the provided digital signature for the real address to the processor for requesting the memory;

receiving at a checker device associated with the processor, the cryptographically signed real address and its digital signature;

verifying at the checker device that the received cryptographically signed real address originated from the translation unit and was not tampered with; and forwarding data at the real address back to the translation unit.

11. The address translation unit of claim 6, wherein the expiration indication comprises one of: a predefined duration, or a time stamp indicating a time after which the validity of the real address is expired.

12. The device of claim 7, wherein the address translator device is configured to provide an expiration indication for the real address, wherein the expiration indication indicates at least one condition for an expiration of the real address.

13. The device of claim 12, wherein the expiration indication comprises one of: a predefined duration, or a time stamp indicating a time after which the validity of the real address is expired.

14. The computer program product of claim 10, wherein said method further comprises: providing an expiration indication for the real address, wherein the expiration indication indicates at least one condition for an expiration of the real address.

15. The computer program product of claim 14, wherein the expiration indication comprises one of: a predefined duration, or a time stamp indicating a time after which the validity of the real address is expired.

* * * * *